(12) United States Patent
Kelly et al.

(10) Patent No.: US 6,508,408 B2
(45) Date of Patent: Jan. 21, 2003

(54) AUTOMATIC WINDGLASS FOG PREVENTION METHOD FOR A VEHICLE CLIMATE CONTROL SYSTEM

(75) Inventors: Sean Michael Kelly, Churchville, NY (US); Karma Vir Sangwan, East Amherst, NY (US)

(73) Assignee: Delphi Technologies, Inc., Troy, MI (US)

( * ) Notice: Subject to any disclaimer, the term of this patent is extended or adjusted under 35 U.S.C. 154(b) by 60 days.

(21) Appl. No.: 09/850,823

(22) Filed: May 8, 2001

(65) Prior Publication Data

US 2002/0166332 A1 Nov. 14, 2002

(51) Int. Cl.⁷ .................................................. B60H 1/00
(52) U.S. Cl. ................... 236/91 C; 62/176.3; 62/176.5; 236/44 C
(58) Field of Search ............................ 62/228.1, 228.4, 62/228.5, 180, 186, 176.1, 176.2, 176.3, 176.5, 176.6, 133; 236/44 R, 44 A, 44 C, 91 R, 91 C, 91 E, 91 F; 165/222, 223, 225, 228, 230

(56) References Cited

U.S. PATENT DOCUMENTS

| | | | | |
|---|---|---|---|---|
| 4,519,443 A | * | 5/1985 | Sutoh et al. ........... | 62/176.5 X |
| 4,783,970 A | * | 11/1988 | Takahashi .................. | 62/176.3 |
| 4,895,000 A | * | 1/1990 | Takahashi ................. | 62/180 X |
| 4,920,755 A | | 5/1990 | Tadahiro ...................... | 62/171 |
| 5,653,904 A | | 8/1997 | Adlparvar et al. .......... | 219/203 |
| 5,701,752 A | | 12/1997 | Tsunokawa et al. .......... | 62/183 |
| 6,112,807 A | * | 9/2000 | Dage .................... | 236/44 C X |
| 6,155,061 A | * | 12/2000 | Davis, Jr. et al. ..... | 236/91 C X |

FOREIGN PATENT DOCUMENTS

| | | |
|---|---|---|
| DE | 19942286 | 9/2000 |
| JP | 60248423 | 12/1985 |

* cited by examiner

Primary Examiner—Harry B. Tanner
(74) Attorney, Agent, or Firm—Patrick M. Griffin

(57) ABSTRACT

An improved vehicle climate control system develops a fog factor indicative of the relative potential of windglass fogging, and uses the index to schedule offsets to normal control settings of the system. The air dewpoint temperature at the front windglass is estimated based on relative humidity and a reference temperature, and the fog factor is determined as a function of the estimated air dewpoint temperature and a measure of the windglass temperature. The fog factor is used to offset an air inlet door, mode doors, refrigerant compressor capacity, discharge air temperature, and blower motor speed.

17 Claims, 3 Drawing Sheets

AUTOMATIC WINDGLASS FOG PREVENTION METHOD FOR A VEHICLE CLIMATE CONTROL SYSTEM

TECHNICAL FIELD

This invention relates to climate control in a motor vehicle, and more particularly to a method of operation for automatically preventing windglass fogging.

BACKGROUND OF THE INVENTION

In general, vehicle climate control systems include a controller that regulates a number of parameters such as blower motor speed, refrigerant compressor activation and/or capacity, air mixing door position, and discharge temperature. In a manual system, the operator directly or indirectly controls the parameters, while in an automatic system, the parameters are automatically controlled in response to a number of inputs, including cabin air temperature, outside air temperature and solar loading, to regulate the cabin air temperature at a set temperature selected by the operator. In either type of system, front and rear windglass defogging functions are ordinarily manually activated by the operator when the perceived desirability of defogging becomes apparent.

The desirability of providing automatic activation of front and rear defogging functions has been recognized in the prior art. See, for example, the U.S. Patents to Adiparvar et al. U.S. Pat. No. 5,653,904 and Tsunokawa et al. U.S. Pat. No. 5,701,752. Adiparvar et al. utilize front glass and rear glass moisture detection sensors in an otherwise conventional system for respectively activating front and rear defogging, while Tsunokawa et al. disclose a heat pump system in which windglass defogging is automatically activated when the measured windglass temperature is lower than the dew point.

While the above-described controls can be used to automatically trigger windglass defogging, they produce abrupt transitions in control functionality, and completely override other desirable control functions such as cabin temperature control, energy efficiency, and air quality management. Accordingly, what is needed is a method of automatically adjusting the operation of a climate control setting to prevent windglass fogging, without producing unnecessarily abrupt or large deviations from the climate control setting otherwise in effect.

SUMMARY OF THE INVENTION

The present invention is directed to an improved vehicle climate control system that develops a fog factor signal indicative of the relative potential of windglass fogging, and uses the index to schedule offsets to the normal control settings. According to the invention, the air dewpoint temperature at or near the front windglass is estimated based on relative humidity and a reference temperature, and the fog factor is determined as a function of the estimated air dewpoint temperature and a measure of the windglass temperature. In the illustrated embodiment, the fog factor is used to offset an air inlet door, mode doors, refrigerant compressor capacity, discharge air temperature, and blower motor speed, as well as to activate any defrost functions on the side glass or rear glass. Advantageously, the control of this invention has priority over existing control settings, regardless of the specific climate control, energy efficiency, or air quality algorithms that may be in effect.

DESCRIPTION OF THE PREFERRED EMBODIMENT

Figure 1:
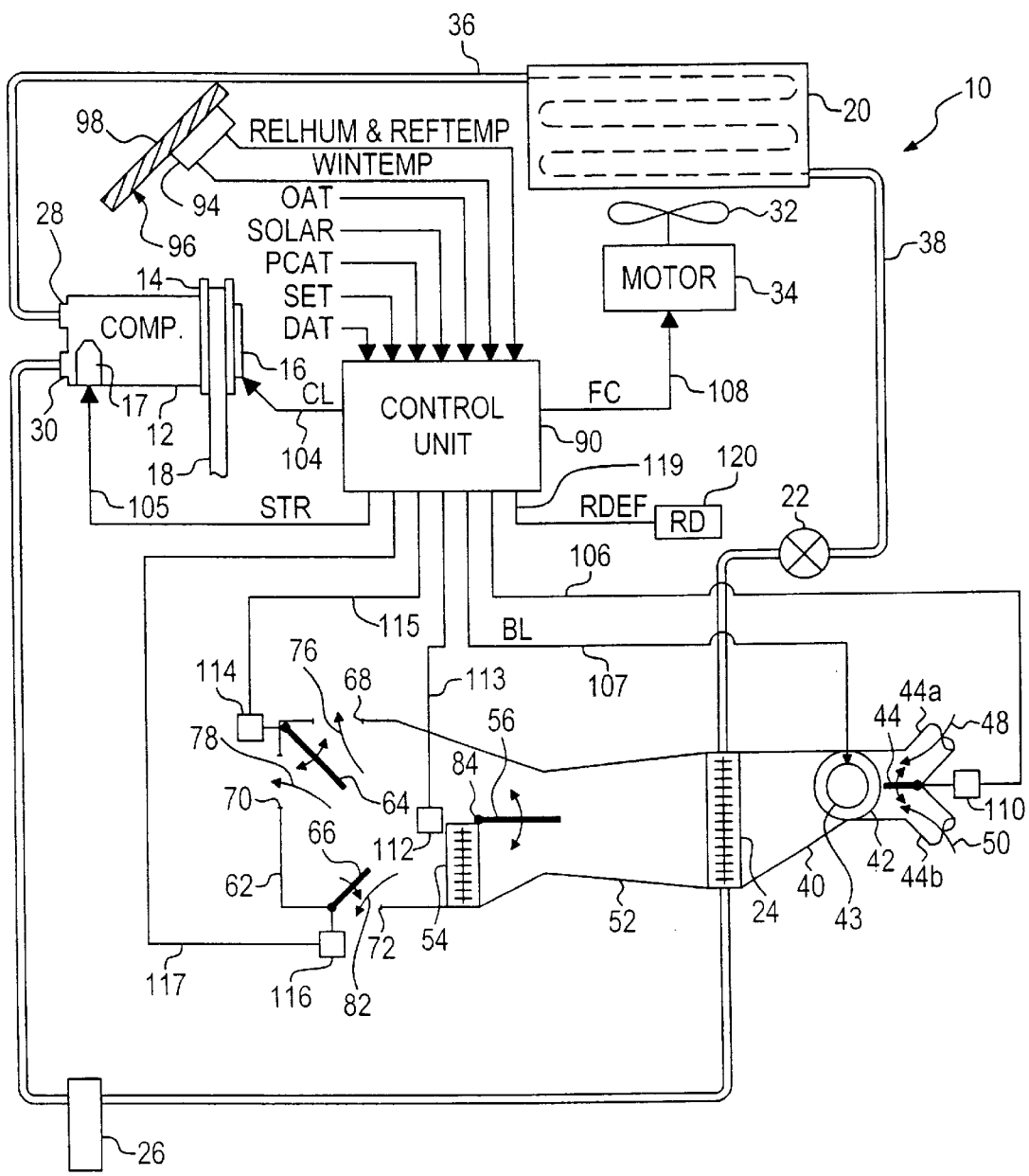
FIG. 1 is a block diagram of a vehicle climate control system according to this invention. including a microprocessor based control unit.

Referring to FIG. 1, the method of this invention is described in the context of a climate control system, generally designated by the reference numeral 10. In the illustrated embodiment, the system 10 includes a variable capacity refrigerant compressor 12 having a stroke control valve 17 that is electrically activated to control the compressor pumping capacity. The compressor input shaft is coupled to a drive pulley 14 via an electrically activated clutch 16, and the drive pulley 14 is coupled to a rotary shaft of the vehicle engine (not shown) via drive belt 18, so that the compressor 12 can be turned on or off by respectively engaging or disengaging the clutch 16. The system 10 further includes a condenser 20, an orifice tube 22, an evaporator 24. and an accumulator/dehydrator 26 arranged in order between the compressor discharge port 28 and suction port 30. The electric drive motor 34 of cooling fan 32 is controlled to provide supplemental airflow for removing heat from high pressure refrigerant in condenser 20. The orifice tube 22 allows the cooled high pressure refrigerant in line 38 to expand in isenthalpic fashion before passing through the evaporator 24. The accumulator/dehydrator 26 separates low pressure gaseous and liquid refrigerant, directs gaseous refrigerant to the compressor suction port 30, and stores excess refrigerant that is not in circulation. In an alternative system configuration. the orifice tube 22 is replaced with a thermostatic expansion valve (TXV); in this case, the accumulator/dehydrator 26 is omitted, and a receiver/drier (R/D) is inserted in line 38 upstream of the TXV to ensure that sub-cooled liquid refrigerant is available at the TXV inlet.

The evaporator 24 is formed as an array of finned refrigerant conducting tubes, and an air intake duct 40 disposed on one side of evaporator 24 houses a motor driven ventilation blower 42 for forcing air past the evaporator tubes. The duct 40 is bifurcated upstream of the blower 42, and an inlet air control door 44 is adjustable as shown to control inlet air mixing; depending on the door position, outside air may enter blower 42 through duct leg 44a as indicated by arrow 48, and passenger compartment air may enter blower 42 through duct leg 44b as indicated by arrow 50.

An air outlet duct 52 disposed on the downstream side of blower 42 and evaporator 24 houses a heater core 54 formed as an array of finned tubes through which flows engine coolant. The heater core 54 effectively bifurcates the outlet duct 52, and a re-heat door 56 next to heater core 54 is adjustable as shown to divide the airflow through and around the heater core 54. The heated and un-heated air portions are mixed in a plenum portion 62 downstream of re-heat door 56, and a pair of mode control doors 64, 66 direct the mixed air through one or more outlets, including a defrost outlet 68, a panel outlet 70, and a heater outlet 72. The mode control door 64 is adjustable as shown to switch the outlet air between the defrost and panel outlets 68, 70, as indicated by arrows 76, 78, respectively. The mode control door 66 is adjustable as shown to control airflow through the heater outlet 72, as indicted by arrow 82.

The above-described components of system 10 are controlled by the microprocessor-based control unit 90, which is responsive to a number of inputs, including relative humidity (RELHUM), a reference temperature (REFTEMP), windglass temperature (WfNTEMP), outside air temperature (OAT), solar loading (SOLAR), passenger compartment air temperature (PCAT), a set temperature (SET) and discharge air temperature (DAT). Sensors for generating the RELHUM, REFTEMP, WINTEMP, SOLAR and PCAT signals are located within the vehicle passenger compartment, and the relative humidity, reference temperature and windglass temperature sensors may be co-located in a single module 94 on an inside surface 96 of front windglass 98 as shown. The reference temperature REFTEMP is simply the air temperature at the point of relative humidity measurement. Other inputs not shown in FIG. 1 include the usual operator demand inputs, such as the override controls for mode, blower motor 43 and rear window defogger grid 120.

In response to the inputs mentioned above, the control unit 90 develops output signals for controlling the compressor clutch 16, the capacity control valve 17, the fan motor 34, blower motor 43, and the air control doors 44, 56, 64 and 66. In FIG. 1, the output signals CL, STR, FC and BL for clutch 16, stroke control valve 17, condenser fan motor 34, and blower motor 43 appear on lines 104, 105, 108 and 107, respectively. The air control doors 44, 56, 64, 66 are controlled by corresponding actuators 110, 112, 114, 116 via lines 106, 113, 115 and 117, respectively. Additionally, the control unit 90 generates an output signal RDEF on line 119 for controlling activation of rear window defogger grid 120.

Figure 2:
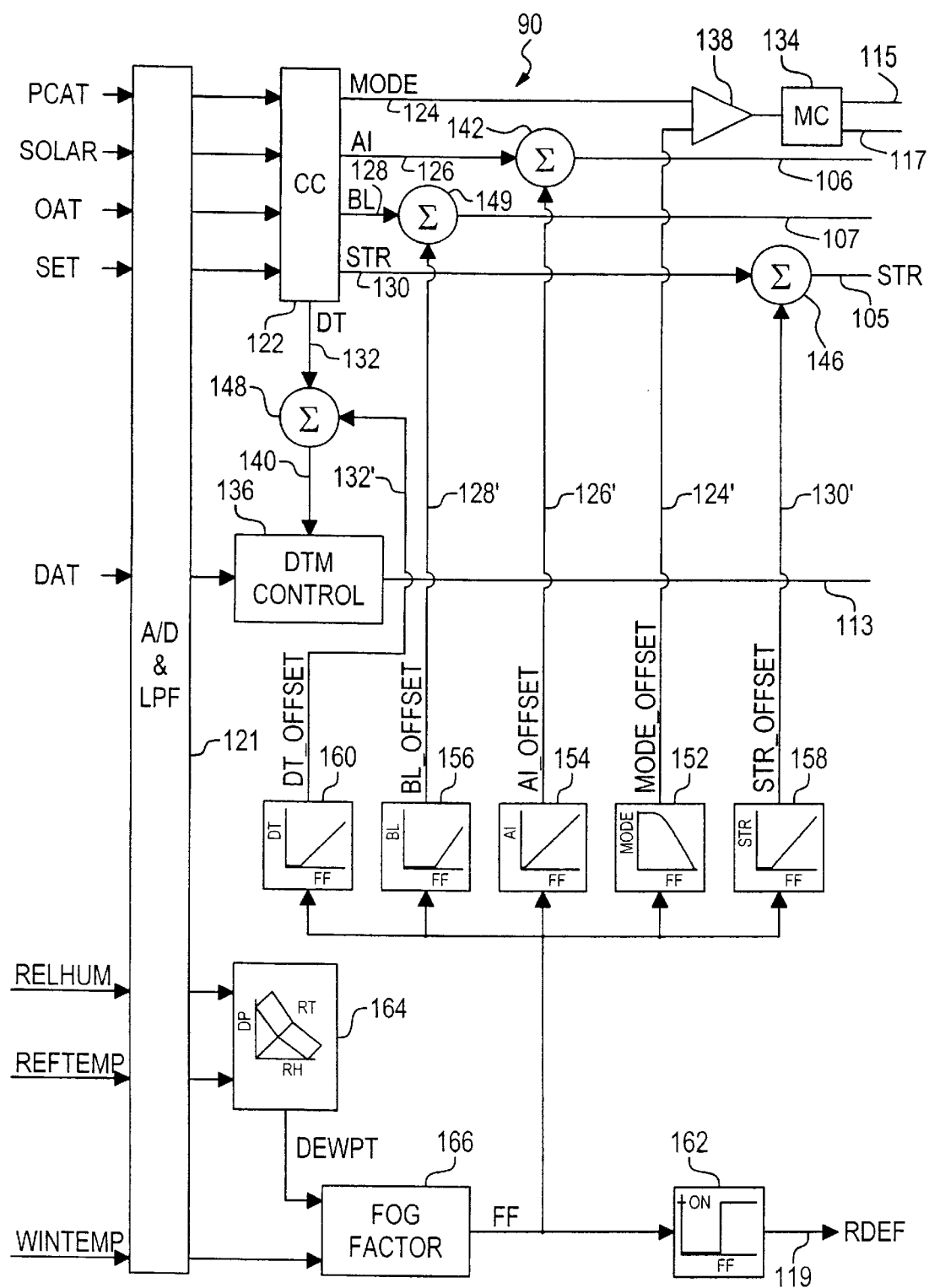
FIG. 2 is a block diagram of the control carried out by the control unit of FIG. 1 according to this invention.

The control unit 90 of FIG. 1 is depicted in the form of a block diagram in FIG. 2. The various inputs mentioned in respect to FIG. 1 are applied to the block 121, which low-pass filters the respective input signals, and converts them to a digital format. The PCAT, SOLAR, OAT and SET inputs are applied to a conventional climate control (CC) block 122, which develops base control signals corresponding to the various control unit outputs mentioned above in reference to FIG. 1. These include a MODE control signal on line 124, an air inlet control signal (AI) on line 126, a blower motor speed control signal (BL) on line 128, a compressor stroke control signal (STR) on line 130 and a discharge temperature control signal (DT) on line 132. The other conventional elements depicted in FIG. 2 include the mode control (MC) block 134 and the discharge temperature maintenance (DTM) control block 136. The MC block 136 develops door position control outputs on lines 115 and 117 for mode doors 64 and 66 based on the signal applied to line 138, and the DTM control block 136 regulates the position of the re-heat door 56 via line 113 to bring the discharge air temperature DAT into correspondence with a temperature control signal on line 140.

Ordinarily, the MODE signal on line 124 is applied as an input to the mode control block 134, the discharge temperature control signal DT on line 132 is applied as an input to DTM control block 136, the AI control signal on line 126 is applied to the air inlet door actuator 110, the BL control signal on line 128 is applied to the blower motor 43, and the STR control signal on line 130 is applied to the stroke control valve 17. However, in a control according to the present invention, the MODE, AI, BL, STR and DT control signals are each subject to modification as required to prevent fogging of the windglass 98. Thus, the AI signal on line 126 is combined in summer 142 with an AI_OFFSET signal on line 126'; the BL signal on line 128 is combined in summer 144 with a BL_OFFSET signal on line 128'; the STR signal on line 130 is combined in summer 146 with a STR_OFFSET signal on line 130'; and the DT signal on line 132 is combined in summer 148 with a DT_OFFSET signal on line 132'. The MODE signal on line 124 and a MODE_OFFSET signal on line 124' are applied to comparator 138; the comparator 138 determines which of the signals will provide the greatest defogging effect, and applies that signal to the mode control block 134.

The above-mentioned offset signals on lines 124', 126', 128', 130' and 132' are developed by the respective look-up tables 152, 154, 156, 158 and 160 as a function of a fog factor FF. The fog factor FF has a value that indicates the relative potential for windglass fogging, where a higher fog factor indicates higher probability of fogging. As indicated in blocks 154, 156, 158 and 160, a fog factor above certain predefined levels tends to increase AI_OFFSET, BL_OFFSET, STR_OFFSET and DT_OFFSET. Increasing AI OFFSET increases the proportion of outside air admitted by air inlet door 44; increasing BL_OFFSET increases the commanded speed of blower motor 43; increasing STR_OFFSET increases the capacity of refrigerant compressor 12; and increasing DT OFFSET increases the discharge temperature command applied to DTM control 136. In the illustrated embodiment, MODE and MODE_OFFSET have a numerical value representative of the commanded mode, where the defrost mode has a low numerical value; accordingly, a fog factor above a certain level tends to decrease MODE_OFFSET toward a defrost setting, as indicated at block 152. The fog factor FF is also applied to the table 162, which activates the rear window defog function RDEF on line 119 when FF exceeds a threshold. Although not shown in FIG. 2, the table 162 would include some hysteresis to prevent rapid successive activation and deactivation of the rear defog function, and a conventional timing function would also be employed to limit the continuous activation time of rear window defogger 120.

It will be recognized that each of the above-described control modifications tend to reduce the likelihood of glass fogging, by either raising the temperature of the glass surface, or lowering the air dewpoint temperature, and the control modifications are phased in to the extent required to prevent fogging. Additionally, within the offset look-up tables, it will be seen that the various control modifications commence at different fog factor values so that the various fog-prevention counter-measures may be activated in a predetermined order and to varying degrees of effect (either linearly or non-linearly) to achieve optimal performance. For example, as the fog factor signal begins to rise from a zero value, the control initially responds by progressively increasing the air inlet offset AI_OFFSET to increase the proportion of outside air entering the passenger compartment. If the fog factor signal continues to rise, AI_OFFSET continues to increase, and the control additionally initiates a progressive increase of the compressor capacity and activates the rear (and side, if applicable) window defogger 120. If the fog factor signal increases further, AI_OFFSET and STR_OFFSET continue to increase, and the control additionally initiates a progressive increase of the discharge temperature offset DT_OFFSET. If the fog factor signal increases yet further, AI_OFFSET, STR_OFFSET and DT_OFFSET continue to increase, and the control additionally initiates a progressive increase of the blower speed offset BL_OFFSET. Further increases in the fog factor signal result in yet further increases in the various offsets until maximum offset values are reached. Obviously, a variety of different control strategies may be used depending on system mechanization and design preferences, and the illustrated use of look-up tables based on fog factor signal enable a high degree of flexibility with respect to offset scheduling and coordination.

Figure 3:
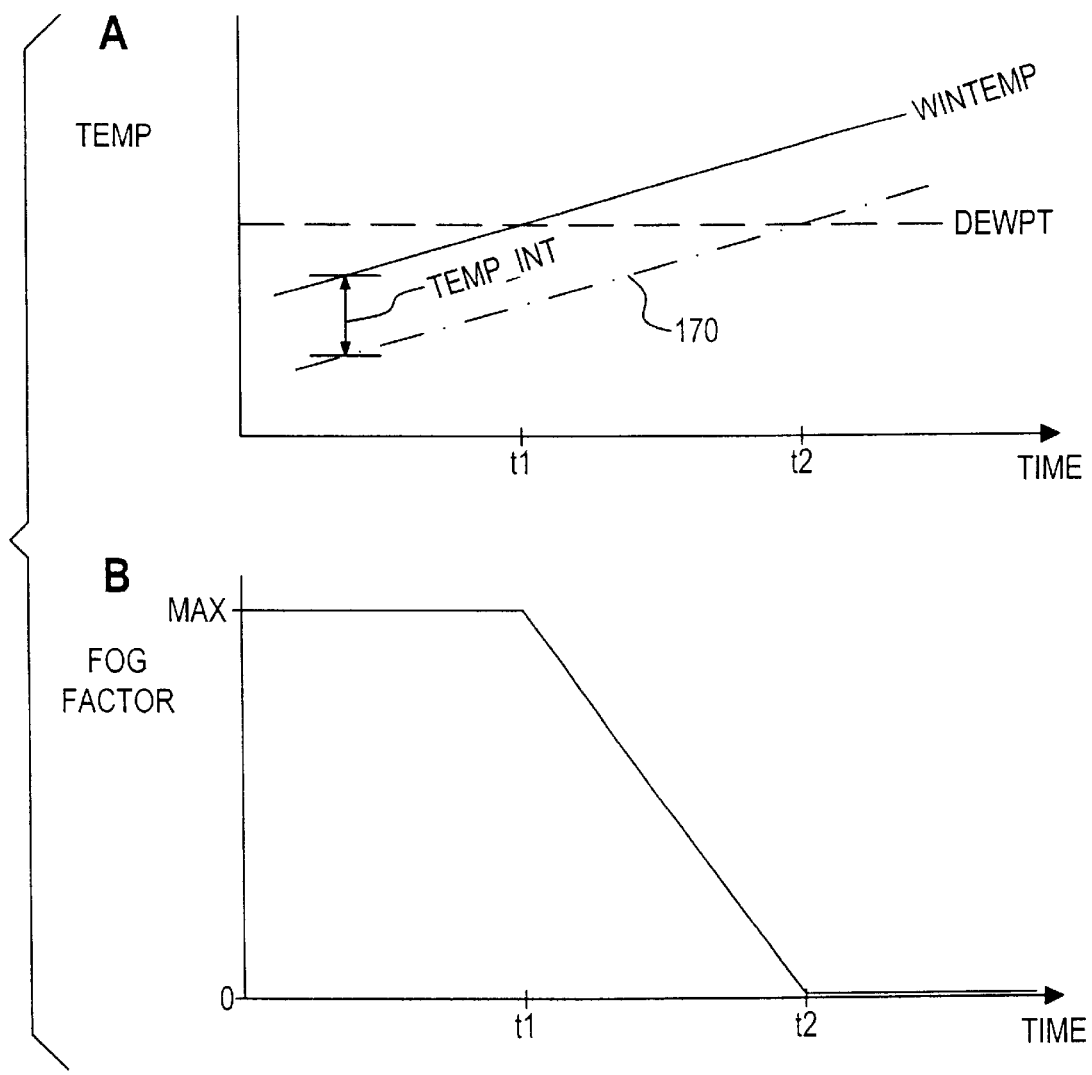
FIG. 3, Graphs A and B illustrate a relationship among dewpoint, windglass temperature and fog factor according to this invention. Graph A depicts the dewpoint and windglass temperature as a function of time, while Graph B depicts the fog factor as a function of time.

The fog factor FF is developed by the blocks 164 and 166 based on the input signals RELHUM, REFTEMP and WINTEMP. The block 164 is a 2-D look-up table that stores air dewpoint temperatures (DEWPT) as a function of RELHUM and REFTEMP, whereas the block 166 calculates the fog factor FF based on DEWPT and the windglass temperature WINTEMP. The relationship among the fog factor FF and the inputs DEWPT and WINTEMP is illustrated in FIG. 3, where Graph A depicts DEWPT and WINTEMP, and Graph B depicts FF, on a common time base. For purposes of illustration, it is assumed that DEWPT remains constant, and that WINTEMP progressively increases, due to the operation of climate control system 10, for example. The block 166 sets fog factor FF to a maximum level MAX whenever WINTEMP is less than DEWPT, and to a zero value whenever WINTEMP exceeds DEWPT by at least a predefined temperature difference referred to herein as TEMP_INT. In other words, FF=MAX when WINTEMP<DEWPT, and FF=0 when WINTEMP>(DEWPT+TEMP_INT). As indicated in Graph A, TEMP_INT is depicted as the temperature difference between WINTEMP and the parallel chain trace 170. For the condition: DEWPT<WINTEMP<(DEWPT+TEMP_INT), which occurs in the time interval $t_1$–$t_2$ in FIG. 3, the fog factor FF is defined according to the expression:

$$FF=[1-(WINTEMP-DEWPT)/TEMP\_INT]* MAX$$

This provides a smooth transition of fog factor FF and the corresponding control modifications, so the control objective of preventing windglass fogging is achieved in a seamless manner that is virtually transparent to the operator of the vehicle.

It will be apparent from the preceding discussion that the value of the term TEMP_INT affects the duration of the transition and the rate of change of the control modifications during the transition. While depicted as a fixed value Graph A of FIG. 3, the term TEMP_INT may be variable depending on vehicle operating conditions. For example, it has been found to be advantageous to set the value of TEMP_INT in inverse relation to the ambient or outside air temperature OAT. When OAT is very low, this has the effect of hastening the modification of the climate control settings, particularly in situations where the relative humidity (and therefore, the dewpoint temperature) in the vehicle rises due to occupant breath level or damp clothing, for example. It has also been found to be advantageous to set the value of TEMP_INT to a relatively high level at the initiation of vehicle operation to provide a quick initial response to prevent fogging, and to thereafter progressively reduce the value of TEMP_INT toward a lower value in direct relation to the elapsed time of vehicle operation so that the degree of control setting override is correspondingly reduced; of course, this may be carried out either alone, or in combination with, the adjustment based on outside air temperature.

In summary, the control of this invention smoothly and non-linearly modifies the normal control outputs of a climate control system to automatically prevent windglass fogging in a way that minimizes the disturbance perceived by the vehicle occupants. When the potential of fogging is reduced, either due to changing environmental conditions or the changes produced by the climate control modifications, the modifications are removed in proportion to the reduced potential of fogging. Since the fog prevention control applies offsets independent of the requested outputs developed by the climate control 122 (which may be responsive at least in part to energy efficiency and/or air quality control considerations), the efficacy of fog prevention is also independent of the control logic employed by the climate control 122. Since the offsets are applied as the final signal modification before output to the associated actuators and regulators, the fog prevention control has the highest control priority. While this invention has been described in reference to the illustrated embodiment, it is expected that various modifications in addition to those mentioned above will occur to those skilled in the art. For example, the control is equally applicable to a so-called manual control system in which the vehicle operator manually generates the MODE, AI, DT and BL outputs of climate control block 122. Likewise, the control is also applicable to manual or automatic systems that incorporate a fixed displacement compressor; in that case, the compressor capacity is adjusted by increasing or decreasing the duty cycle of the compressor clutch 16. Thus, it will be understood that control methods incorporating these and other modifications may fall within the scope of this invention, which is defined by the appended claims.

What is claimed is:

1. A method of operation for a climate control system of a vehicle, where the vehicle has a passenger compartment bounded in part by a windglass, and where the climate control system includes a plurality of control elements and generates a plurality of control signals for controlling respective control elements to condition air in the passenger compartment, the method of operation comprising the steps of:

estimating a dewpoint temperature of air in the passenger compartment;

measuring a surface temperature of said windglass in said passenger compartment;

developing a fog factor indicative of a relative potential of windglass fogging based on the estimated dewpoint temperature and the measured windglass surface temperature; and modifying the control signals generated by said climate control system so as to increase a defogging effect of the respective control elements in relation to said fog factor.

2. The method of operation of claim 1, wherein the step of estimating the dewpoint temperature includes the steps of:

measuring a relative humidity of the air in the passenger compartment;

measuring a temperature of the passenger compartment air at a point where said relative humidity is measured; and estimating said dewpoint temperature based on the measured relative humidity and the measured air temperature.

3. The method of operation of claim 1, wherein the step of developing the fog factor includes the step of:

setting the fog factor to a value that produces a maximum increase in the defogging effect of the respective control elements when the measured windglass surface temperature is less than the estimated dewpoint temperature.

4. The method of operation of claim 1, wherein the step of developing the fog factor includes the step of:

setting the fog factor to a value that produces no increase in the defogging effect of the respective control elements when the measured windglass surface temperature is greater than the estimated dewpoint temperature by at least a predefined temperature difference.

5. The method of operation of claim 4, including the steps of:

measuring a temperature of ambient air outside the passenger compartment; and scheduling said predefined temperature difference in inverse relation to the measured ambient air temperature.

6. The method of operation of claim 4, including the steps of:

setting said predetermined temperature difference to a relatively high value at an initiation of vehicle operation; and reducing said predefined temperature difference in direct relation to an elapsed time following the initiation of vehicle operation.

7. The method of claim 1, wherein the step of developing the fog factor includes the steps of:

setting the fog factor to a maximum value that produces a maximum increase in the defogging effect of the respective control elements when the measured windglass surface temperature is less than the estimated dewpoint temperature;

setting the fog factor to a minimum value that produces no increase in the defogging effect of the respective control elements when the measured windglass surface temperature is greater than the estimated dewpoint temperature by at least a predefined temperature difference; and setting the fog factor to a value proportionally intermediate said maximum and minimum values based on the measured windglass surface temperature, the estimated dewpoint temperature and the predefined temperature difference, when said measured windglass surface temperature exceeds the estimated dewpoint temperature by an amount that is less than said predefined temperature difference.

8. The method of operation of claim 7, wherein the step of setting the fog factor to a value proportionally intermediate said maximum and minimum values comprises setting the fog factor equal to:

$$[1-(WINTEMP-DEWPT)/TEMP\_INT]*MAX$$

where WINTEMP is the measured windglass surface temperature, DEWPT is the estimated dewpoint temperature, TEMP_INT is the predefined temperature difference, and MAX is said maximum value.

9. The method of operation of claim 7, including the steps of:

measuring a temperature of ambient air outside the passenger compartment; and scheduling said predefined temperature difference in inverse relation to the measured ambient air temperature.

10. The method of operation of claim 7, including the steps of:

setting said predetermined temperature difference to a relatively high value at an initiation of vehicle operation; and reducing said predefined temperature difference in direct relation to an elapsed time following the initiation of vehicle operation.

11. The method of claim 1, wherein the step of modifying the control signals generated by said climate control system includes the steps of:

developing a plurality of offset signals for respective control elements of said climate control system based on the developed fog factor; and applying said offset signals to the control signals generated by the climate control system for controlling said respective control elements.

12. The method of claim 1, wherein said control elements include a blower motor having a controlled speed, and the step of modifying the control signals generated by said climate control system increases said controlled speed in proportion to said fog factor.

13. The method of claim 1, wherein said control elements include an air inlet mechanism that admits passenger compartment air and outside air into said passenger compartment, and the step of modifying the control signals generated by said climate control system increases a percentage of outside air admitted by said air inlet mechanism in proportion to said fog factor.

14. The method of claim 1, wherein said control elements include a heating mechanism for controlling heating of said passenger compartment air, and the step of modifying the control signals generated by said climate control system increases the heating of said passenger compartment air in proportion to said fog factor.

15. The method of claim 1, wherein said control elements include a refrigerant compressor having a controlled capacity, and the step of modifying the control signals generated by said climate control system increases the controlled capacity of said compressor in proportion to said fog factor.

16. The method of claim 1, wherein said control elements include a mode control mechanism for controlling air discharge location in said passenger compartment, and the step of modifying the control signals generated by said climate control system includes the steps of:

developing an offset signal for said mode control mechanism based on the developed fog factor;

comparing said offset signal to a control signal generated by said climate control system for controlling said mode control mechanism to identify which of the compared signals would provide a greater defogging effect; and controlling said mode control mechanism in accordance with such identified signal.

17. The method of operation of claim 1, wherein said vehicle includes a rear window defogger, and the method includes the step of:

activating said rear window defogger if the developed fog factor is above a threshold value.

* * * * *